Sept. 20, 1932.    W. SCHÄFER    1,877,981
DEVICE FOR DETERMINING THE QUANTITATIVE RELATION
OF THE COMPONENTS OF A COMPOSITE SUBSTANCE
Filed March 22, 1929    2 Sheets-Sheet 2
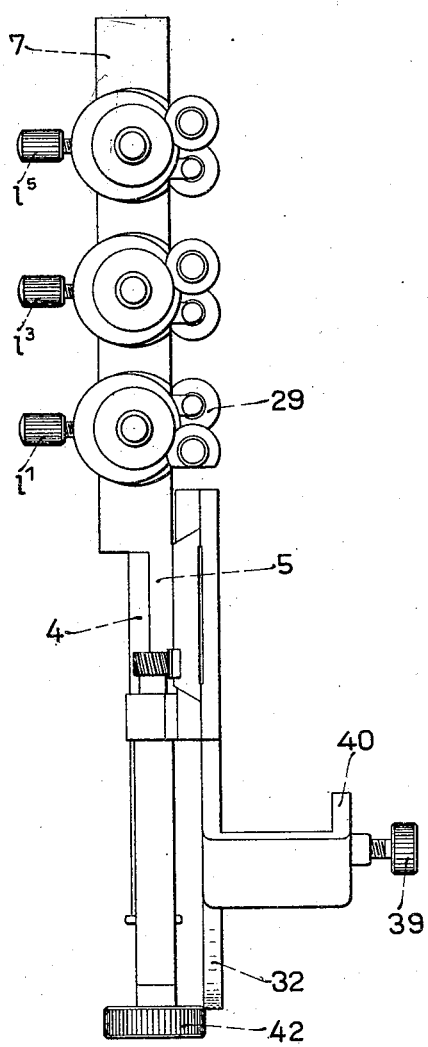
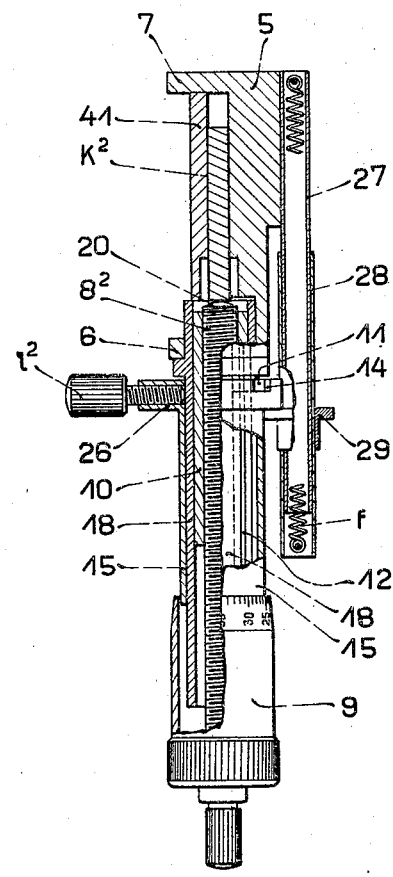
Willy Schäfer
INVENTOR Patented Sept. 20, 1932

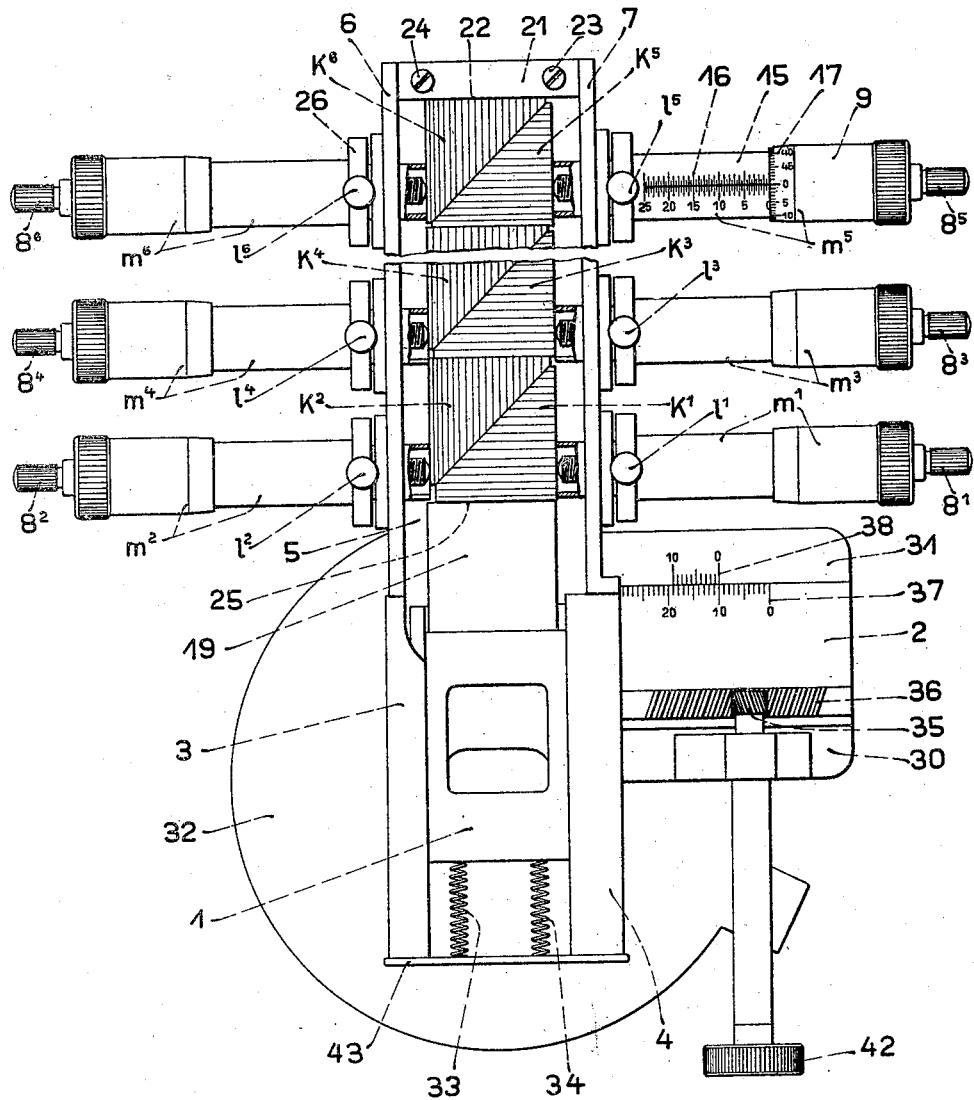

1,877,981

UNITED STATES PATENT OFFICE

WILLY SCHÄFER, OF WETZLAR, GERMANY, ASSIGNOR TO THE FIRM ERNST LEITZ, OPTISCHE WERKE, OF WETZLAR, GERMANY

DEVICE FOR DETERMINING THE QUANTITATIVE RELATION OF THE COMPONENTS OF A COMPOSITE SUBSTANCE

Application filed March 22, 1929, Serial No. 349,170, and in Germany April 2, 1928.

The invention relates to a device for ascertaining the quantitative ratio of the components of a composite substance by measuring the lengths of the particles.

Devices of this kind have been in use for the geometrical analysis of rocks and operate by moving the specimen which is to be analyzed under an optically fixed point, and then measuring the length of the motions of certain individual components. The individual measurements are added and reduced to percentage values. The movement and measurement of the mineral is effected by means of two slides operated by screws and moving within each other and mounted within an outer stationary frame. The cut, ground and polished specimen is affixed to the inner slide and the whole apparatus mounted upon the stage of a microscope. The measurement having been completed with respect to a certain component, say quartz in granite, along any given line, the apparatus is screwed back. It is then displaced transversely by a screw or other suitable means, after which the measurement is repeated along a fresh line. In these known devices it is not practicable to measure differently constituted components in one operation. They are restricted to measuring one particular component and the whole process must be repeated for every other component. This involves the further disadvantage that the values resulting from measurements along any individual gauge line require to be written down for subsequent addition at the end of the whole process.

The invention here described eliminates these disadvantages by an arrangement whereby each component has a separate movement and means of measuring it, and whereby the final result of all measured lines is indicated at the conclusion of the operation.

The drawings show a particular form in which the invention may be applied.

Fig. 1 is a general plan view of the apparatus.

Fig. 2 is a side elevation of Fig. 1, looking from right to left.

Fig. 3 is a cross section of one of the measuring devices.

The device consists of a circular base bracket 32 provided with means 39 and 40 for attachment to an instrument such as a microscope for example. The bracket 32 has guides 30, 31 between which is slidably mounted a transverse slide 2 operable by a screw 35 having a knob 42 in engagement with a rack 36 on the slide. The latter has a scale 37 which cooperates with a vernier 38 on one of the guides to indicate the magnitude of the movement of the slide.

The slide 2 carries a base 5 having longitudinal guides 6 and 7 in the form of upstanding flanges. 3 and 4 are guides for the longitudinal slide 1 to which is secured an abutment 19 having a straight edge 25. The slide 1 is movable longitudinally by means to be presently described against the tension of slide returning springs 33, 34 which operate against a stop 43.

The slide 1 is moved against the springs by means of wedges, in this case six, numbered $K^1$ to $K^6$ inclusive. The wedges are capable of moving longitudinally to shift the slide 1 being placed between the latter and a forward fixed stop 21 having a straight edge 22 and secured to the base 5 by screws 23, 24. Transversely the wedges are individually moveable between the guides 6 and 7 by means of individual measuring devices marked $m^1$ to $m^6$ inclusive. As these measuring devices are exactly alike the description of one of them will be sufficient and therefore in Figure 1 only one of these devices is illustrated complete.

Each measuring device, see Figure 3, consists of a fixed sleeve 18 which is secured to the adjacent flange 6 or 7 and forms a bearing for the measuring device. Inside the sleeve 18 there is a tubular nut 10 provided with a nose 11 which slides in a slot 12 in the sleeve. The nose projects beyond the sleeve 18 and outside the latter the nose engages a notch 14 in a scale tube 15 which surrounds the sleeve 18. Thus the scale tube 15 and the nut 10 operate together as one element. The tube 15 may be clamped to 18 by a screw. The clamping screws are marked $1^1$ to $1^6$ inclusive.

From this it will be seen that when the screw $1^1$ is clamped down on sleeve 18, the scale tube 15 and the nut 10 cannot move being engaged with each other at 11—14. Conversely, when the screw $1^1$ is loosened, the scale tube 15 and the nut are together free to slide with respect to the sleeve 18 but cannot rotate because of the nose 11 which can only slide in the slot 12 in the sleeve 18, but cannot rotate in the latter when the screw $1^1$ is loosened. 9 indicates a tubular graduated head which is secured to an operating screw $8^2$ in engagement with the nut 10. A scale 17 on the head 9 cooperates with another scale 16 on the tube 15. The head 9 is adapted to move in over the tube 15. The screws 8 are in the same horizontal plane as the corresponding wedges $K^1$ to $K^6$, which are covered by a plate 41, Figure 3.

When the clamping screws $1^1$—$1^6$ are loosened, the screws 8 are kept in contact with their respective wedges by means of a spring $f$ located within a tube 27 and secured to a sleeve 28. The latter carries a collar 29 in engagement with the collar 26 on the scale tube 15 which also serves as a bearing for the clamping screw. When therefore all clamping screws are loosened and the springs 33—34 push the slide 1 and the wedges back into initial positions, the screws 8 remain in touch with the wedges.

The device is attached to the stage of a microscope so that its longitudinal axis is parallel with the vertical thread in the objective, all scales are set at zero and the screws $1^1$—$1^6$ screwed down. The specimen is placed on slide 1 and its component parts measured by moving the slide 1 with the specimen a certain distance longitudinally for each component.

For instance if a specimen having three components is to be measured, the procedure is as follows: The specimen is first located under the microscope by means of measuring device $m^4$ for instance. This is done by rotating tubular head 9 whereby the screw 8 is moved inwardly against its wedge $K^4$. Due to the angular formation, wedges $K^1$—$K^4$ will move longitudinally a certain distance and in turn move the slide 1 against the springs 33—34. The specimen having been located, the measuring device $m^1$ is used to measure the first component part. The movement is observed in the microscope and shown on the fixed and movable scales 16 and 17. Thereafter device $m^2$ is operated for the second component, and finally $m^3$ is operated. Each time a measuring device is operated, the slide 1 with the specimen is moved and the distance registered on the scales. For such parts of the specimen which are not to be measured, the specimen is moved by $m^4$ or $m^5$ for instance. These measurements may have been made along a single line, but if necessary, the entire measuring apparatus may be shifted transversely on slide 2 in order to measure along another longitudinal. For exact results it is better to make the transverse movements as small as possible.

From the foregoing it will be clear that by continuous operation of the three measuring devices, the totals of each of the three sets of measurements will be shown on the scales 16 and 17 and then written down for report.

When the operation is finished, the screws $1^1$ etc. are loosened and the springs 33—34 will then push the slide 1 and the wedges forward into initial position. The scales 17 however will still show the measurements. Thereafter the screws $1^1$ etc. are again fastened and the scales set at zero for another operation.

If there are portions on the specimen which are not to be measured, then a certain measuring device is selected to move the specimen a distance until a component appears. The measuring thereof may then be resumed.

I claim:

1. An instrument for measuring the component parts of a composite specimen comprising means for placing the specimen in an initial position, a plurality of independently operable measuring units, means actuated by the operation of any one of said measuring units for moving the specimen successively distances in the same direction as determined by the dimensions of its component parts, each of said measuring units including means for measuring and indicating each of the movements of the specimen, and mechanism for supporting said measuring and indicating means arranged so that all of said indications remain visible at the completion of all of the said measuring operations.

2. An instrument for measuring the component parts of a composite specimen comprising means for placing the specimen in an initial position, a plurality of independently operable measuring units, means actuated by the operation of any one of said measuring units for moving the specimen successively distances in the same direction as determined by the dimensions of its component parts, each of said measuring units including means for measuring and indicating each of the movements of the specimen and operable from a locked starting position, mechanism for supporting said measuring and indicating means arranged so that all of said indications remain visible at the completion of all of the measuring operations, means for releasing said units from their locked starting positions and mechanism for restoring said specimen moving means to initial positions without disturbing the indications of the measurements made during the operation of the instrument.

3. An instrument for measuring the component parts of a composite specimen comprising means for placing the specimen in an initial position, a plurality of independently operable measuring units, a plurality of abutting wedges actuated by the operation of any one of said measuring units for moving the specimen successively distances in the same direction as determined by the dimensions of its component parts, each of said measuring units including means for measuring and indicating each of the movements of the specimen, and mechanism for supporting said measuring and indicating means arranged so that all of said indications remain visible at the completion of all of the said measuring operations.

4. An instrument for measuring the component parts of a composite specimen comprising means for placing the specimen in an initial position, a plurality of independently operable measuring units, a plurality of abutting wedges actuated by the operation of any one of said measuring units for moving the specimen successively distances in the same direction as determined by the dimensions of its component parts, each of said measuring units including means for measuring and indicating each of the movements of the specimen and operable from a locked starting position, mechanism for supporting said measuring and indicating means arranged so that all of said indications remain visible at the completion of all of the measuring operations, means for releasing said units from their locked starting positions and mechanism for restoring said specimen moving wedges to initial positions without disturbing the indications of the measurements made during the operation of the instrument.

5. An instrument for measuring the component parts of a composite specimen comprising means for placing the specimen in an initial position, a plurality of independently operable measuring units, means actuated by the operation of any one of said measuring units for moving the specimen successively distances in the same direction as determined by the dimensions of its component parts, each of said measuring units including means for measuring and indicating each of the movements of the specimen, mechanism for supporting said measuring and indicating means arranged so that all of said indications remain visible at the completion of all of the said measuring operations and means for moving the specimen in another direction without disturbing the indications made by any one or more of said measuring units.

Signed at Frankfort-on-the-Main, Germany, this sixth day of March A. D. 1929.

WILLY SCHÄFER.